(12) United States Patent
Imai (10) Patent No.: US 9,669,736 B2
(45) Date of Patent: Jun. 6, 2017

(54) SADDLE-RIDING TYPE VEHICLE (71) Applicant: HONDA MOTOR CO., LTD., Tokyo (JP)

(72) Inventor: Ryoji Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 353 days.

(21) Appl. No.: 14/330,329

(22) Filed: Jul. 14, 2014

(65) Prior Publication Data
US 2015/0042122 A1    Feb. 12, 2015

(30) Foreign Application Priority Data
Aug. 8, 2013 (JP) .................................. 2013-165517

(51) Int. Cl.
| B62K 11/00 | (2006.01) |
| B60N 2/02 | (2006.01) |
| B62J 1/06 | (2006.01) |
| B62J 1/08 | (2006.01) |

(52) U.S. Cl.
CPC .............. B60N 2/02 (2013.01); B62J 1/06 (2013.01); B62J 1/08 (2013.01)

(58) Field of Classification Search
CPC ...... B62K 11/04; B62K 2700/38; B62K 11/00
USPC .............. 180/219; 297/215.13, 215.14
See application file for complete search history.

(56) References Cited

U.S. PATENT DOCUMENTS

| 227,511 | A | * | 5/1880 | Salsbury | .................. | B62K 5/08 |
| | | | | | | 188/5 |
| 2,271,805 | A | * | 2/1942 | Salsbury | .................... | B62J 1/02 |
| | | | | | | 180/219 |
| 4,506,754 | A | * | 3/1985 | Hirano | ....................... | B62J 1/12 |
| | | | | | | 180/219 |
| 4,629,201 | A | * | 12/1986 | Tsukiji | ................... | B62K 11/04 |
| | | | | | | 180/219 |
| 7,243,750 | B2 | * | 7/2007 | Nakabayashi | ........... | B62J 25/00 |
| | | | | | | 180/219 |
| 7,249,648 | B2 | * | 7/2007 | Michisaka | ............. | B62K 11/10 |
| | | | | | | 180/219 |
| 7,621,362 | B2 | * | 11/2009 | Ogawa | ...................... | B62J 1/08 |
| | | | | | | 180/219 |
| 7,980,633 | B2 | * | 7/2011 | Koyano | ..................... | B62J 1/12 |
| | | | | | | 297/195.11 |

(Continued)

FOREIGN PATENT DOCUMENTS

| JP | GB 2379431 A | * | 3/2003 | ................ | B62J 9/00 |
| JP | 2011-057069 A | | 3/2011 | | |

*Primary Examiner* — Joseph Rocca
*Assistant Examiner* — Conan Duda
(74) *Attorney, Agent, or Firm* — Squire Patton Boggs (US) LLP (57) ABSTRACT

A vehicle includes vehicle body-side steps having a plurality of abutment surfaces on which seat-side protrusions abut from above. Each abutment surface has a height different from each other, with the seat being adjustable in height by selectively abutting the seat-side protrusions on the abutment surfaces. A rider's seat has a covering portion formed at a front portion thereof and extending substantially in parallel with an inclined upper surface of a fuel tank. When abutment positions of the seat-side protrusions are changed from either first ones of the abutment surfaces to second ones, the covering portion changes a position thereof so as to slide substantially in parallel with the inclined upper surface of the fuel tank.

12 Claims, 7 Drawing Sheets

(56) References Cited

U.S. PATENT DOCUMENTS

2011/0057486 A1\* 3/2011 Inoue ........................ B62J 1/12
297/215.13

\* cited by examiner

SADDLE-RIDING TYPE VEHICLE

BACKGROUND

Field

The present invention relates to a saddle-riding type vehicle.

Description of the Related Art

Patent Document 1 (Japanese Patent Laid-Open No. 2011-57069) discloses a motorcycle including a step-like height adjusting member disposed on a bottom plate of a seat on which an occupant sits, the height adjusting member enabling a height of the seat to be adjusted.

The motorcycle disclosed in Patent Document 1 has a structure wherein adjusting the height of the seat disposed posterior to a fuel tank results in the seat being moved in a longitudinal direction. No consideration is, however, given to prevention of a change in appearance before and after the adjustment. As a result, continuity in appearance of the seat and the fuel tank is likely to change greatly before and after a seat height adjustment, so that a visual impression of the vehicle appearance may change.

SUMMARY

It is therefore an object of the present invention to provide a saddle-riding type vehicle that can prevent vehicle visual appearance of the vehicle from being changed by minimizing a change in the vehicle appearance before and after an adjustment made of a seat height.

To solve the foregoing problem, an embodiment of the provides a saddle-riding type vehicle including a vehicle body frame, and a fuel tank supported on the vehicle body frame. A seat is supported on the vehicle body frame, and downwardly protruding seat-side protrusions are disposed on a bottom plate of the seat. Vehicle body-side steps are disposed below the seat-side protrusions, and the vehicle body-side steps have a plurality of abutment surfaces on which the seat-side protrusions abut from above. Each abutment surface has a height different from each other, and the seat is adjustable in height by selectively abutting the seat-side protrusions on the abutment surfaces. The fuel tank has an upper surface formed into an incline that extends more downwardly toward a rear, and the seat has a covering portion formed at a front portion thereof and which extends substantially in parallel with the inclined upper surface of the fuel tank. The covering portion covers the upper surface from above. When abutment positions of the seat-side protrusions are changed from either first ones of the abutment surfaces to second ones, the covering portion changes a position thereof so as to slide substantially in parallel with the inclined upper surface of the fuel tank.

According to another embodiment of the present invention, the seat-side protrusions are mounted separately on the bottom plate. The bottom plate has seat-side recesses disposed immediately before the seat-side protrusions. The seat-side recesses are formed by indenting upwardly or penetrating the bottom plate, and when the abutment positions of the seat-side protrusions are changed from either first ones of the abutment surfaces to second ones among the abutment surfaces, so that the first ones of the abutment surfaces are adjusted to be higher than the second ones and a height of the seat is adjusted to be lowered, the first ones of the abutment surfaces are housed in the seat-side recesses.

According to another embodiment of the present invention, the vehicle body-side steps are formed into a stair having integrally a plurality of steps on which the abutment surfaces are set. The vehicle body-side steps are supported on the vehicle body frame.

According to another embodiment of the present invention, the seat-side protrusions and the vehicle body-side steps are each disposed in pairs at a middle portion and a rear portion of the seat. The seat-side protrusions and the vehicle body-side steps are disposed above or on the inside in a vehicle width direction of the vehicle body frame.

According to another embodiment of the present invention, of the vehicle body-side steps disposed in pairs at the middle portion and the rear portion of the seat, first ones disposed at either one of the middle portion and the rear portion of the seat are disposed on a cross frame that connects portions provided in pairs of the vehicle body frame. Second ones disposed at the other of the middle portion and the rear portion of the seat are directly disposed on the vehicle body frame.

According to another embodiment of the present invention, the seat includes an insert disposed at a rear end portion thereof. The insert is inserted into an insert holder formed on a vehicle body side. The seat further has a locked tab to be locked by a seat lock mechanism disposed on the vehicle body side. The insert holder is formed in a multiple-tier stack so as to allow the insert to be inserted into a tier associated with each adjustment position when the seat is adjusted in height. The locked tab has step-shaped locking parts to be locked by the seat lock mechanism, the step-shaped locking parts being associated with respective adjustment positions when the seat is adjusted in height.

According to another embodiment of the present invention, the locked tab is disposed between the pair of left and right seat-side protrusions disposed at the middle portion of the seat, and the seat lock mechanism is mounted on the cross frame that connects portions provided in pairs of the vehicle body frame.

According to certain embodiments, a condition is maintained in which the covering portion formed at the front portion of the seat extends substantially in parallel with the upper surface of the fuel tank before and after the height adjustment of the seat. This can minimize a change in vehicle appearance before and after the adjustment, thereby allowing a visual impression of the vehicle appearance to be prevented from being changed.

According to certain embodiments, height adjustments can be made with the protrusions and the recesses on the seat side and the vehicle body side and load of the seat can be reliably supported by the vehicle body-side steps. Additionally, the structure involved is simplified, so that a manufacturing cost can be reduced.

According to certain embodiments, the simplified structure permits one-piece forming, so that the manufacturing cost can be reduced.

According to certain embodiments, the load of the seat can be steadily supported at four points at front and rear and at left and right.

According to certain embodiments, the load of the seat can be steadily supported at four points at front and rear and at left and right in the vehicle body frame.

According to certain embodiments, the rear end portion of the seat can be positioned and the seat can be locked in place suitably without any impediments before and after the adjustment.

According to certain embodiments, the seat lock mechanism and the locked tab are sandwiched laterally between the seat-side protrusions, and between the vehicle body-side steps, so that the seat lock mechanism and the locked tab can

DETAILED DESCRIPTION

Embodiments of the present invention will be described below with reference to the accompanying drawings. The drawings show arrows to indicate directions, an arrow FR denoting a vehicle forward direction, an arrow UP denoting a vehicle upward direction, and an arrow LH denoting a vehicle leftward direction, respectively.

Figure 1:
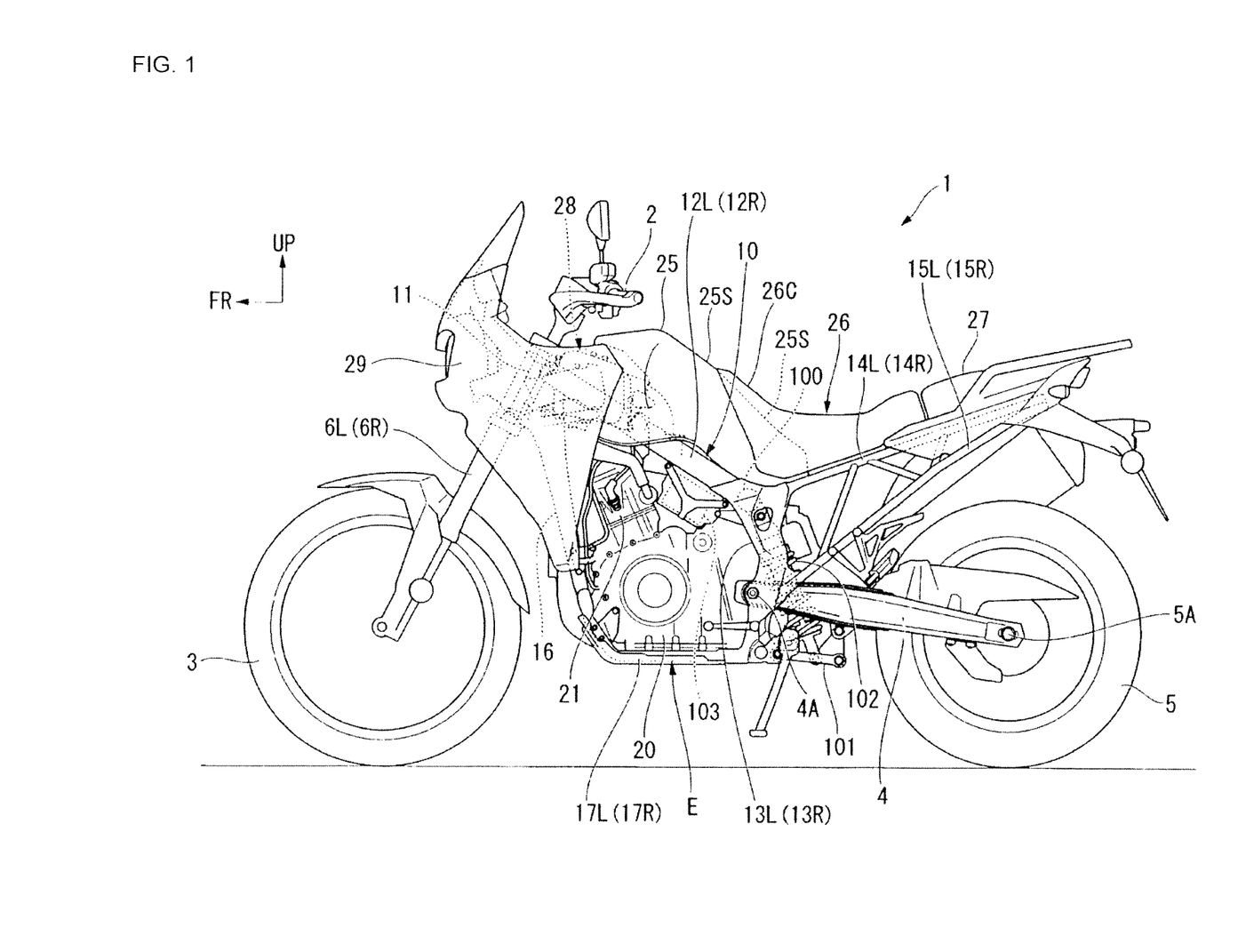
FIG. 1 is a left-side elevational view showing a motorcycle according to an embodiment of the present invention.

FIG. 1 is a left-side elevational view showing a motorcycle 1 as a saddle-riding type vehicle according to an embodiment of the present invention. The motorcycle 1 includes an engine E disposed between a front wheel 3 steered by a steering handlebar 2 and a rear wheel 5 disposed at a rear end portion of a swing arm 4. Steering system parts including the steering handlebar 2 and the front wheel 3 are steerably and pivotally supported on a head pipe 11 at a front end of a vehicle body frame 10. The swing arm 4 has a front end portion swingably supported on the vehicle body frame 10 and a rear end portion supporting an axle 5A of the rear wheel 5.

The vehicle body frame 10 includes a plurality of frame members integrated together through, for example, welding. The vehicle body frame 10 includes the head pipe 11, a pair of left and right main frames 12L and 12R, a pair of left and right pivot plates 13L and 13R, a pair of left and right seat rails 14L and 14R, and a pair of left and right sub-frames 15L and 15R. The main frames 12L and 12R branch out laterally from the head pipe 11 to extend rearwardly and downwardly. The pivot plates 13L and 13R are connected to rear end portions of the respective main frames 12L and 12R and extend downwardly. The seat rails 14L and 14R are connected to upper portions of the respective pivot plates 13L and 13R and extend rearwardly and upwardly. The sub-frames 15L and 15R are connected to the respective pivot plates 13L and 13R at positions below the respective seat rails 14L and 14R, extend rearwardly and upwardly, and have rear end portions connected to the respective seat rails 14L and 14R.

The vehicle body frame 10 further includes a down frame 16 and a pair of left and right lower frames 17L and 17R. The down frame 16 extends rearwardly and downwardly from the head pipe 11 at a sharper angle than the main frames 12L and 12R do. The lower frames 17L and 17R branch out laterally from a lower end portion of the down frame 16 to extend rearwardly. The lower frames 17L and 17R have rear end portions connected to lower end portions of the respective pivot plates 13L and 13R. In the vehicle body frame 10, the main frames 12L and 12R, the seat rails 14L and 14R, and the pivot plates 13L and 13R are connected together so as to form a Y shape in a side view.

In FIG. 1, those members that are not visible therein are denoted by reference symbols given in parentheses for convenience of explanation. In figures other than FIG. 1, those members invisible therein may also be denoted by reference symbols given in parentheses for convenience of explanation.

The vehicle body frame 10 is a semi-double cradle type that surrounds the engine E with the down frame 16 and the lower frames 17L and 17R from the forward and downward directions, the engine E being disposed below the main frames 12L and 12R and at front of the pivot plates 13L and 13R. The engine E is supported by the vehicle body frame 10 at a plurality of engine support portions disposed at appropriate positions of the vehicle body frame 10.

Of each of the pair of left and right main frames 12L and 12R, the pair of left and right pivot plates 13L and 13R, the pair of left and right seat rails 14L and 14R, the pair of left and right sub-frames 15L and 15R, and the pair of left and right lower frames 17L and 17R, the left-hand side one is disposed on the left relative to the center in a vehicle width direction and the right-hand side one is disposed on the right relative to the center in the vehicle width direction. The left and right parts of each of these pairs are connected to each other by a cross frame (not shown) at an appropriate position.

The engine E includes a crankcase 20 and a cylinder 21 connected to the crankcase 20 so as to form a V shape in a side view. The crankcase 20 integrally houses therein a crankshaft and a transmission. The cylinder 21 protrudes upwardly (upwardly toward the front, to be more precisely) from an upper surface at a front side of the crankcase 20. The engine E is disposed such that the crankcase 20 and the cylinder 21 fit into space surrounded by the main frames 12L and 12R, the pivot plates 13L and 13R, the down frame 16, and the lower frames 17L and 17R. The cylinder 21 is in a condition in which a cylinder axis direction (a direction in which the cylinder stands) extends substantially along a direction in which the down frame 16 extends. It is here noted that a battery 103 is disposed in space surrounded by the cylinder 21, the main frames 12L and 12R, the pivot plates 13L and 13R, and the crankcase 20. The battery 103 is housed in a battery case via which the battery 103 is supported on the main frames 12L and 12R.

The steering system parts supported by the head pipe 11 includes the front wheel 3, a pair of left and right front forks 6L and 6R supporting at the lower portion thereof the front wheel 3, a steering shaft (not shown) connected to upper portions of the front forks 6L and 6R and passed through, and rotatably supported by, the head pipe 11, and the steering handlebar 2 disposed on an upper portion side of the steering shaft.

The swing arm 4 is connected to the pivot plates 13L and 13R by a pivot shaft 4A disposed at a substantially central portion in a vertical direction in the pair of left and right pivot plates 13L and 13R of the vehicle body frame 10. The pivot shaft 4A extends across the left and right pivot plates 13L and 13R. The swing arm 4 is vertically swingable about a center of an axis extending laterally.

A cross frame 100 is disposed to extend across upper portions of the pivot plates 13L and 13R. A linkage member 101 is disposed to extend across a substantially central portion in the longitudinal direction of a lower portion of the swing arm 4 and the lower portions of the pivot plates 13L and 13R. Additionally, a rear cushion 102 is disposed to extend between the linkage member 101 and the cross frame 100.

A fuel tank 25 is supported on the main frames 12L and 12R. In an area posterior to the fuel tank 25, a rider's seat 26 is supported on upper portions at the front side of the seat rails 14L and 14R and a pillion seat 27 is supported on upper portions at the rear side of the seat rails 14L and 14R. Seating portions in the rider's seat 26 and the pillion seat 27 extend along the seat rails 14L and 14R.

The fuel tank 25 extends from a position posterior to the head pipe 11 and below the steering handlebar 2 downwardly toward the rear along the main frames 12L and 12R thereabove, reaching a position above the pivot plates 13L and 13R. The fuel tank 25 has an upper surface 25S formed into an incline that extends more downwardly toward the rear substantially along the main frames 12L and 12R.

The upper surface 25S of the fuel tank 25 has a rear portion covered from above with a covering portion 26C formed at a front portion of the rider's seat 26 and extending substantially in parallel with the upper surface 25S of the fuel tank 25. The covering portion 26C is formed to extend upwardly toward the front from the seating portion of the rider's seat 26.

It is noted that the covering portion 26C extends substantially in parallel with the upper surface 25S when the covering portion 26C extends completely in parallel with the upper surface 25S and the covering portion 26C extends along the upper surface 25S with a slight difference in inclination angle therebetween.

An air cleaner 28 is disposed between the head pipe 11 and the fuel tank 25. A front portion of the fuel tank 25 has a recess (not shown) indented rearwardly formed therein, the recess housing therein part of the air cleaner 28.

A front cover 29 is disposed around the head pipe 11. The front cover 29 extends toward the front and laterally (toward the outside in the vehicle width direction) of the head pipe 11 to thereby cover the head pipe 11 from the front and lateral sides. The front cover 29 covers the front portion of the fuel tank 25 and the air cleaner 28 from the lateral sides.

Figure 2:
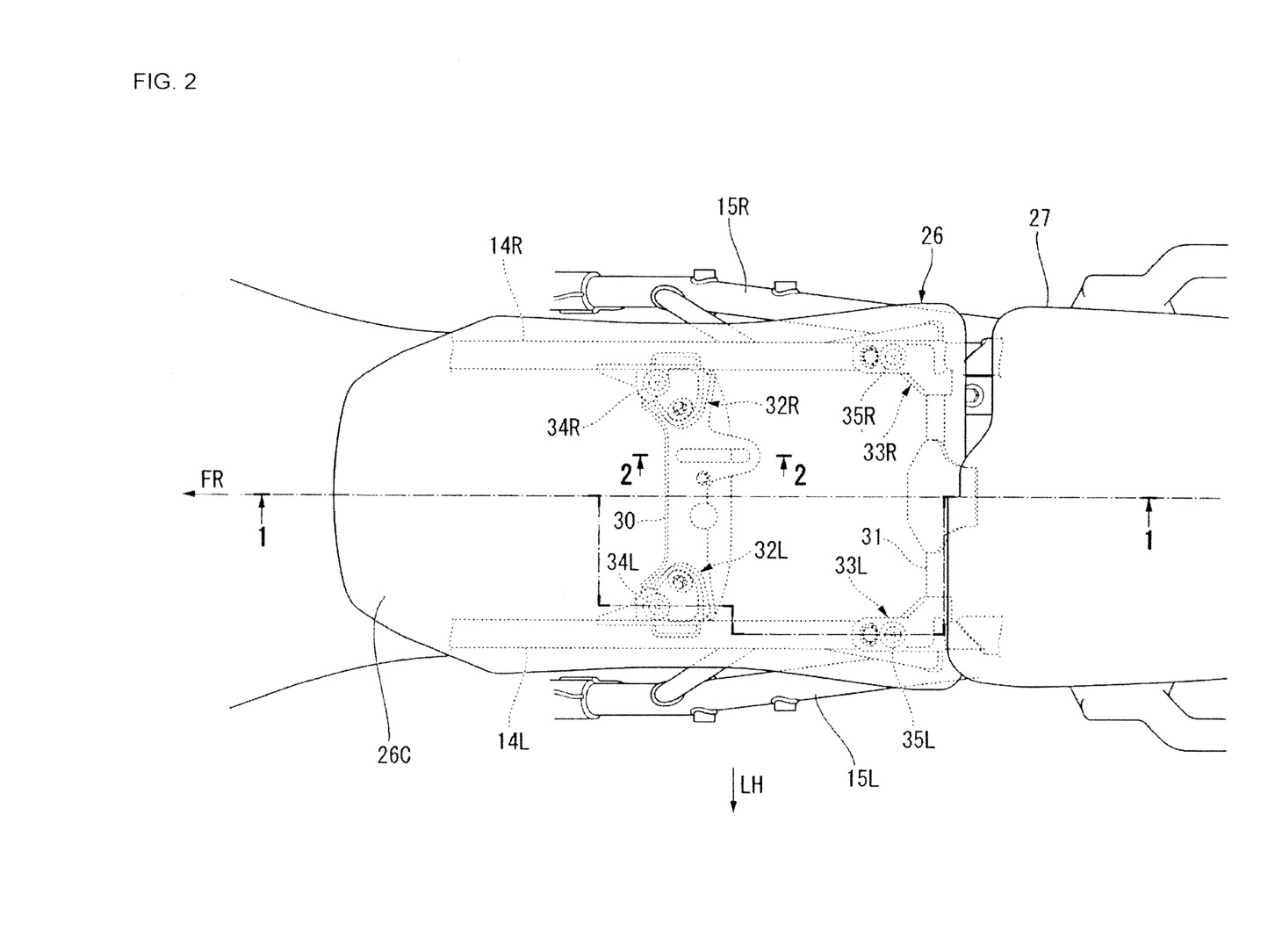
FIG. 2 is a top view showing a seat and parts disposed therearound of the motorcycle described above.
Figure 3:
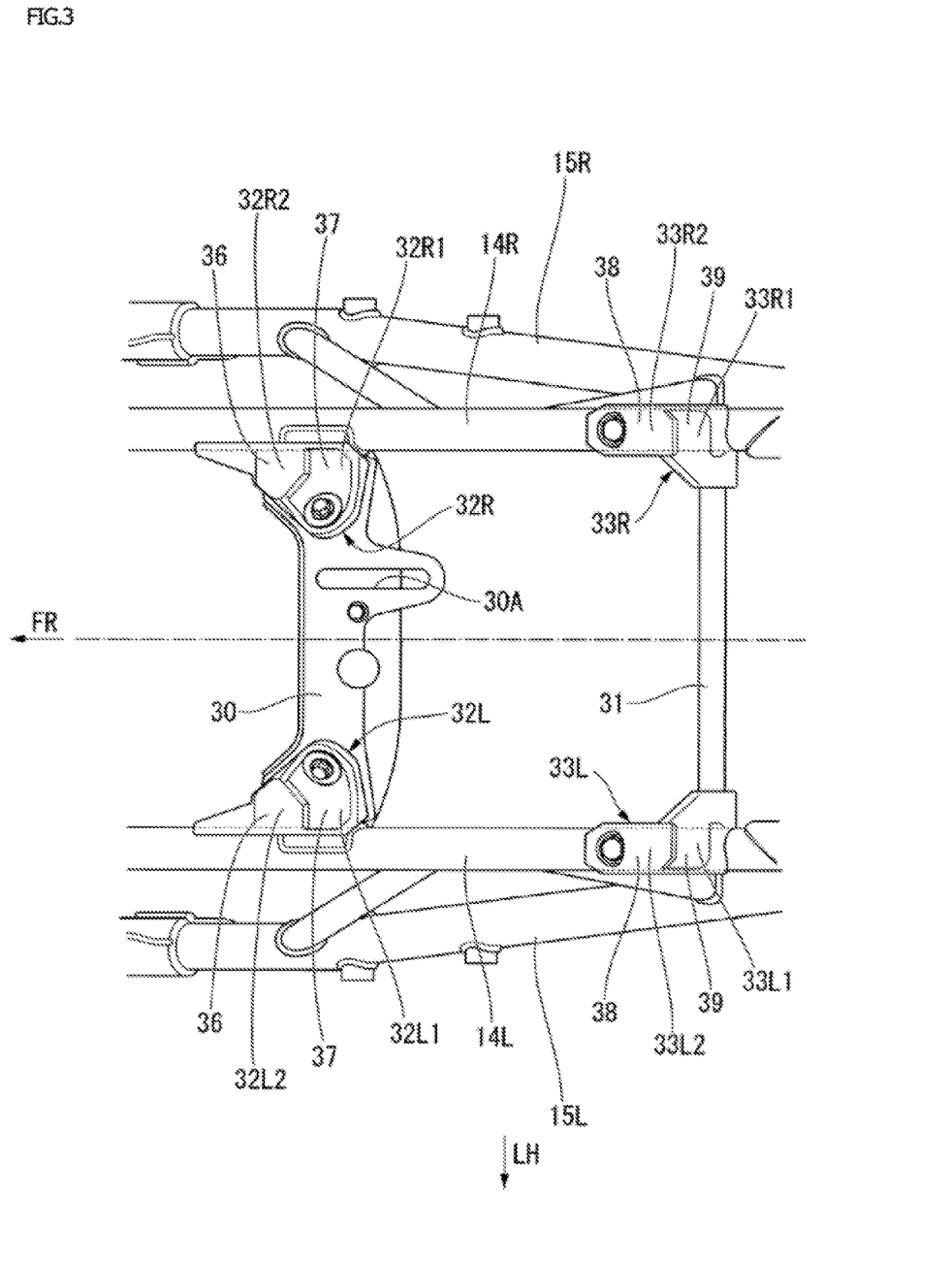
FIG. 3 is a top view showing a portion under the seat of the motorcycle described above.

FIG. 2 is a top view showing the rider's seat 26. FIG. 3 shows a portion under the rider's seat 26 with the rider's seat 26 removed from the condition shown in FIG. 2. As shown in FIG. 3, front portions of the left and right seat rails 14L and 14R disposed below the rider's seat 26 are connected to each other by a first cross frame 30 and a second cross frame 31 disposed posterior to the first cross frame 30.

The first cross frame 30 has front vehicle body-side steps 32L and 32R on respective lateral end portions thereof. The seat rails 14L and 14R have rear vehicle body-side steps 33L and 33R near respective left and right connections thereof to the second cross frame 31.

Figure 4:
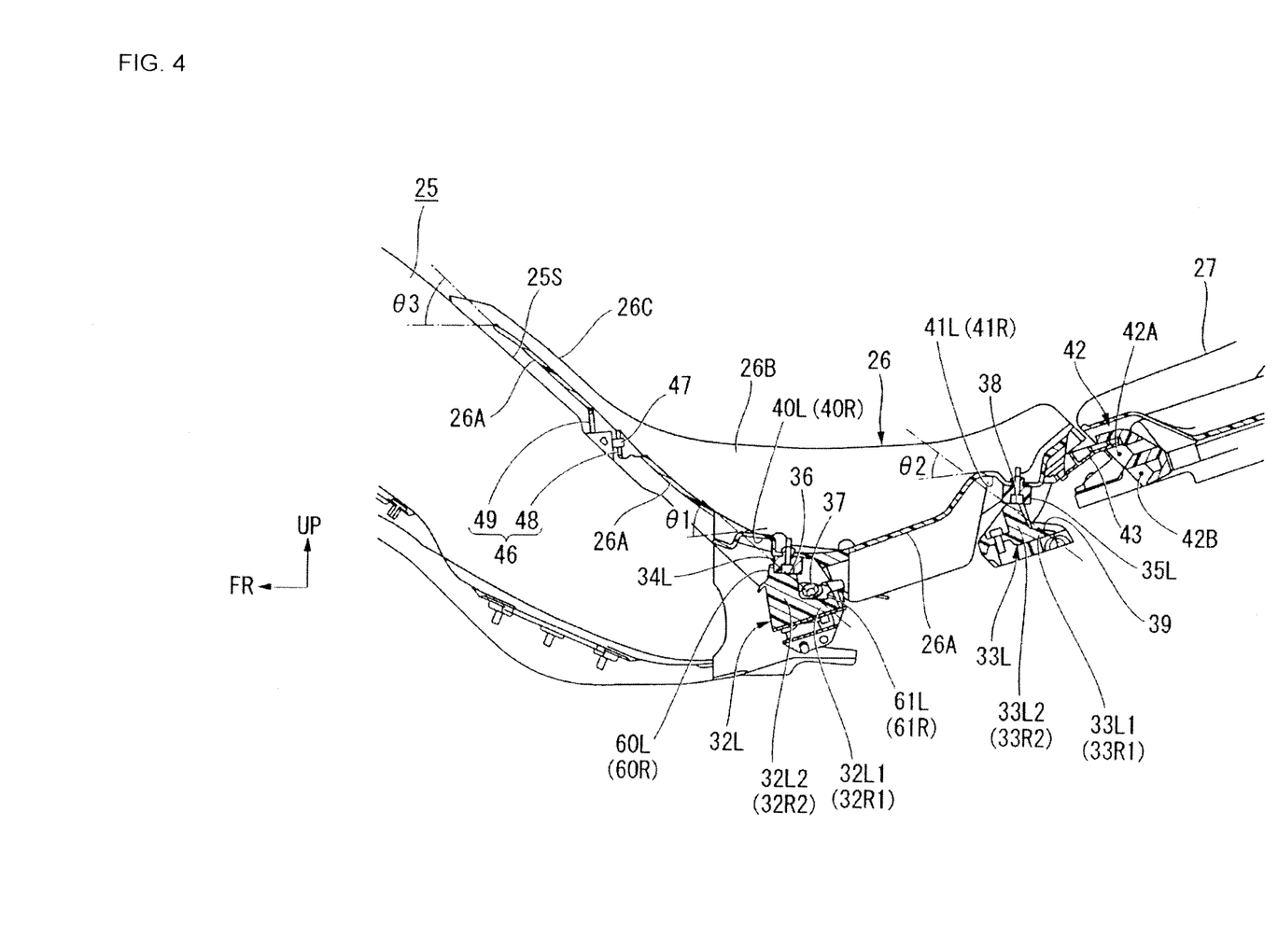
FIG. 4 is a cross-sectional view taken along line 1-1 of FIG. 2.

Reference is also made to FIGS. 2 and 4. The rider's seat 26 includes a bottom plate 26A. The bottom plate 26A has left and right front seat-side protrusions 34L and 34R and left and right rear seat-side protrusions 35L and 35R. The front seat-side protrusions 34L and 34R that protrude downwardly are associated with the front vehicle body-side steps 32L and 32R. The rear seat-side protrusions 35L and 35R that protrude downwardly are associated with the rear vehicle body-side steps 33L and 33R.

The front vehicle body-side steps 32L and 32R are disposed beneath the front seat-side protrusions 34L and 34R. The front vehicle body-side steps 32L and 32R have a plurality of abutment surfaces (front high-level abutment surfaces 36 and front low-level abutment surfaces 37 to be described later), each surface having a height different from each other. The front seat-side protrusions 34L and 34R abut on the abutment surfaces from above. The rear vehicle body-side steps 33L and 33R are disposed beneath the rear seat-side protrusions 35L and 35R. The rear vehicle body-side steps 33L and 33R have a plurality of abutment surfaces (rear high-level abutment surfaces 38 and rear low-level abutment surfaces 39 to be described later), each surface having a unique height different from heights of the other. The rear seat-side protrusions 35L and 35R abut on the abutment surfaces from above.

As shown in FIGS. 3 and 4, the present embodiment includes the front seat-side protrusions 34L and 34R and the rear seat-side protrusions 35L and 35R, and the front vehicle body-side steps 32L and 32R and the rear vehicle body-side steps 33L and 33R, each being disposed in pairs at a middle portion and a rear portion of the rider's seat 26.

The motorcycle 1 enables the rider's seat 26 to be adjusted in height by selectively bringing the front seat-side protrusions 34L and 34R and the rear seat-side protrusions 35L and 35R into abutment with the abutment surfaces of the front vehicle body-side steps 32L and 32R and the rear vehicle body-side steps 33L and 33R.

FIG. 4 shows a condition in which the front seat-side protrusions 34L and 34R and the rear seat-side protrusions 35L and 35R are in abutment with, and supported by, the front high-level abutment surfaces 36 and the rear high-level abutment surfaces 38.

Figure 6:
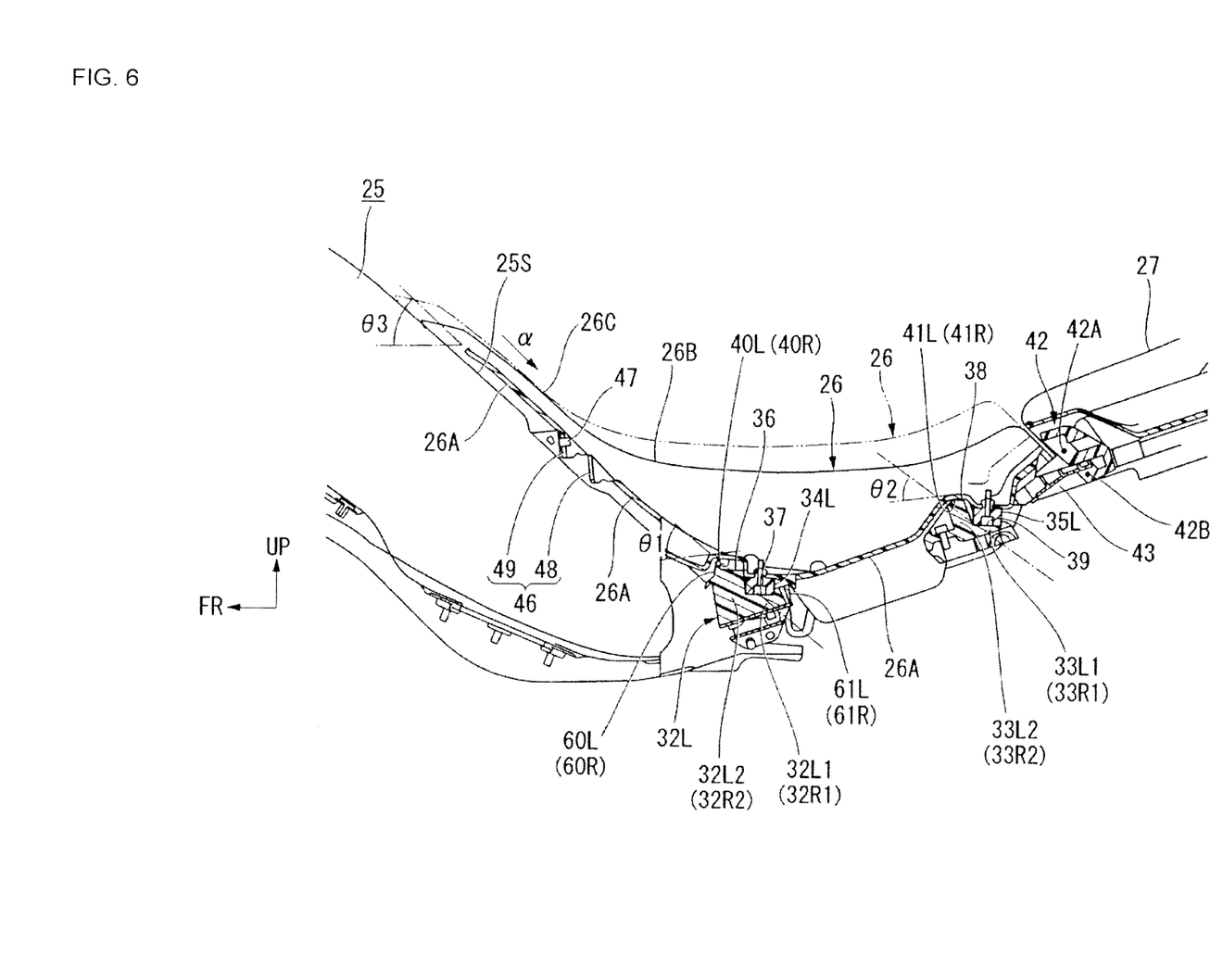
FIG. 6 is a cross-sectional view showing a condition in which the height of the seat is lowered one step from the condition of FIG. 4.

Specifically, in the motorcycle 1, the seat height can be adjusted by removing the rider's seat 26 from the condition shown in FIG. 4 and then, as shown in FIG. 6, setting up a condition in which the front seat-side protrusions 34L and 34R and the rear seat-side protrusions 35L and 35R are in abutment with, and supported by, the front low-level abutment surfaces 37 and the rear low-level abutment surfaces 39.

By shifting the condition of the rider's seat 26 from that shown in FIG. 4 to that shown in FIG. 6, the height of the rider's seat 26 is adjusted from a high level to a low level. For convenience of explanation, FIG. 6 indicates the rider's seat 26 in the condition shown in FIG. 4 by a dash-double-dot line. To change from the low level to the high level, the rider's seat 26 is shifted from the condition shown in FIG. 6 to that shown in FIG. 4.

The following describes in detail a height adjustment structure for the rider's seat 26. The rider's seat 26 includes the bottom plate 26A formed of a resin material and a seat main unit 26B which is fixed to the bottom plate 26A and in which urethane, for example, is packed to gain a thickness from the bottom plate 26A. In the embodiment, the front seat-side protrusions 34L and 34R and the rear seat-side protrusions 35L and 35R are separately mounted to the bottom plate 26A.

The front seat-side protrusions 34L and 34R and the rear seat-side protrusions 35L and 35R each have a cylindrical shape formed of an elastic member such as synthetic rubber. The front seat-side protrusions 34L and 34R and the rear seat-side protrusions 35L and 35R are each fastened to the bottom plate 26A through a bolt passed through the bottom plate 26A in an axial direction of the bolt.

Additionally, front seat-side recesses 40L and 40R are formed immediately before the front seat-side protrusions 34L and 34R. The front seat-side recesses 40L and 40R are formed in the bottom plate 26A by indenting the bottom plate 26A upwardly. Further, rear seat-side recesses 41L and 41R are formed immediately before the rear seat-side protrusions 35L and 35R. The rear seat-side recesses 41L and 41R are formed in the bottom plate 26A by indenting the bottom plate 26A upwardly.

As shown in FIG. 6, when the height of the rider's seat 26 is adjusted from the high level to the low level, the front seat-side recesses 40L and 40R and the rear seat-side recesses 41L and 41R provide space in which portions on which the front high-level abutment surfaces 36 are formed (second steps 32L2 and 32R2 to be described later) and portions on which the rear high-level abutment surfaces 38 are formed (second steps 33L2 and 33R2 to be described later) are housed.

The front vehicle body-side steps 32L and 32R are each formed into a two-step stair in the embodiment. The front vehicle body-side steps 32L and 32R include first steps 32L1 and 32R1 on which the front low-level abutment surfaces 37 oriented upwardly are formed and the second steps 32L2 and 32R2 on which the front high-level abutment surfaces 36 disposed at levels higher than the front low-level abutment surfaces 37 and oriented upwardly are formed, the first steps 32L1 and 32R1 and the second steps 32L2 and 32R2 being arranged in tandem in the longitudinal direction.

Similarly, the rear vehicle body-side steps 33L and 33R are each formed into a two-step stair in the embodiment. The rear vehicle body-side steps 33L and 33R include first steps 33L1 and 33R1 on which the rear low-level abutment surfaces 39 oriented upwardly are formed and the second steps 33L2 and 33R2 on which the rear high-level abutment surfaces 38 disposed at levels higher than the rear low-level abutment surfaces 39 and oriented upwardly are formed, the first steps 33L1 and 33R1 and the second steps 33L2 and 33R2 being arranged in tandem in the longitudinal direction.

Referring to FIG. 3, the front vehicle body-side steps 32L and 32R are disposed on both lateral end portions of the first cross frame 30, so that the front vehicle body-side steps 32L and 32R are disposed on the inside in the vehicle width direction of the seat rails 14L and 14R. Thus, the front seat-side protrusions 34L and 34R are disposed on the inside in the vehicle width direction of the seat rails 14L and 14R.

The rear vehicle body-side steps 33L and 33R are disposed in abutment on upper surfaces of the seat rails 14L and 14R and the rear vehicle body-side steps 33L and 33R and the rear seat-side protrusions 35L and 35R are disposed above the seat rails 14L and 14R.

Referring to FIGS. 4 and 6, front positioning tabs 60L and 60R are formed to extend upwardly at front edges of the second steps 32L2 and 32R2 of the front vehicle body-side steps 32L and 32R. Additionally, rear positioning tabs 61L and 61R are formed to extend upwardly at rear edges of the first steps 32L1 and 32R1 of the front vehicle body-side steps 32L and 32R.

Referring to FIG. 4, the front seat-side protrusions 34L and 34R, when abutted on the front high-level abutment surfaces 36, are positioned by being brought into abutment with or close to the front positioning tabs 60L and 60R from the rear. Referring to FIG. 6, the front seat-side protrusions 34L and 34R, when abutted on the front low-level abutment surfaces 37, are positioned by being clamped between and brought into abutment with or close to, in the longitudinal direction, the rear positioning tabs 61L and 61R, and step surfaces created between the first steps 32L1 and 32R1 and the second steps 32L2 and 32R2.

The rider's seat 26 includes an insert 43 at a rear end portion thereof. The insert 43 is to be inserted into an insert holder 42 formed on the vehicle body side. The insert 43 assumes a plate shape formed of a resin material. The insert 43 is disposed at a rear end portion of the bottom plate 26A of the rider's seat 26 and protrudes rearwardly.

The insert holder 42 positions the rider's seat 26 during a height adjustment process and restricts movement of the rider's seat 26 after the height adjustment process. In the embodiment, the insert holder 42 is disposed at a front end portion of the pillion seat 27. The insert holder 42 includes a high-level receiving holder 42A and a low-level receiving holder 42B into which the insert 43 is inserted with a gap in accordance with the height of the rider's seat 26. The high-level receiving holder 42A and the low-level receiving holder 42B are formed in a two-tier stack. The high-level receiving holder 42A and the low-level receiving holder 42B each have a rearwardly recessed space and the insert 43 is inserted into the recessed space.

During the height adjustment process for the rider's seat 26, an operator inserts to position the insert 43 into either one of the high-level receiving holder 42A and the low-level receiving holder 42B of the insert holder 42. After the height adjustment process for the rider's seat 26, the high-level receiving holder 42A and the low-level receiving holder 42B at least cover the insert 43 from above, thereby restricting upward movement of the rider's seat 26.

Figure 5:
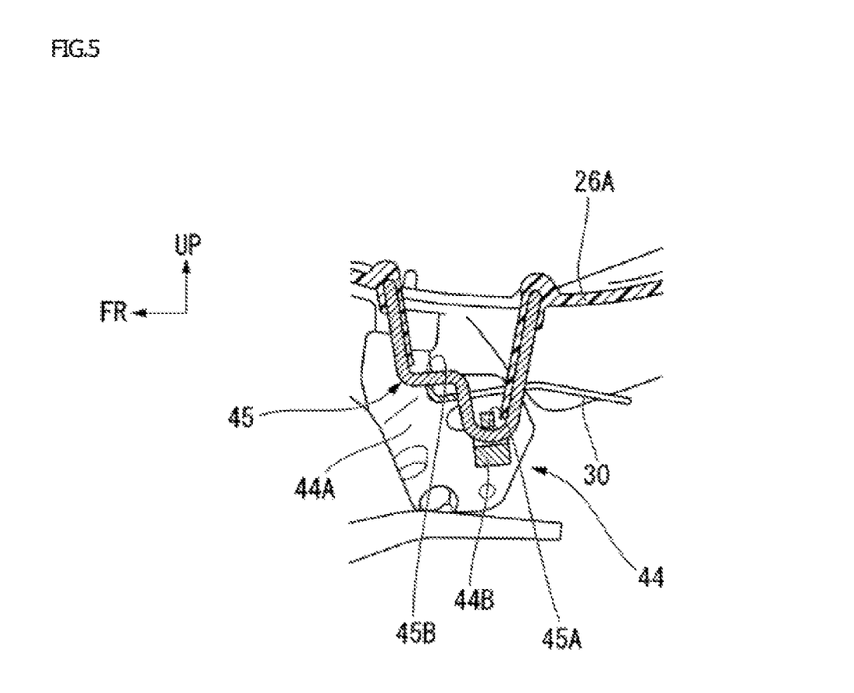
FIG. 5 is a cross-sectional view taken along line 2-2 of FIG. 2.
Figure 7:
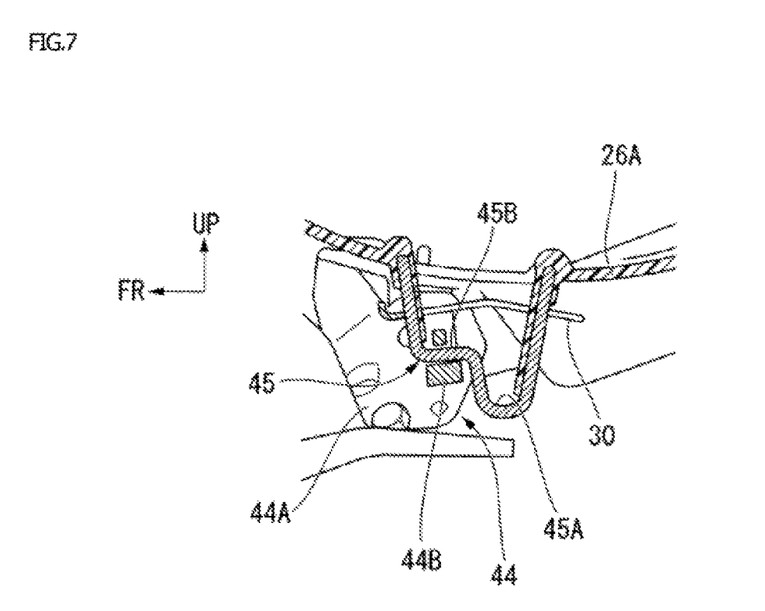
FIG. 7 is a cross-sectional view showing a condition in which the height of the seat is lowered one step from the condition of FIG. 5.

As shown in FIGS. 5 and 7, the bottom plate 26A of the rider's seat 26 has a locked tab 45 to be locked by a seat lock mechanism 44 disposed on the vehicle body side. The locked tab 45 is formed of a metal round bar bent into a substantially U-shaped member. The substantially U-shaped member has both end portions fixed to the bottom plate 26A to thereby protrude downwardly and thus has a bottom portion oriented downwardly. Additionally, the locked tab 45 is disposed between the front seat-side protrusions 34L and 34R.

The seat lock mechanism 44 includes a base section 44A and a latch section 44B. The base section 44A is fixed to a lower surface of the first cross frame 30. The latch section 44B is movably supported by the base section 44A and locks the locked tab 45. It is noted that, as shown in FIG. 3, the first cross frame 30 has a slit 30A formed therein. The locked tab 45 is passed through the slit 30A from above with a gap allowed in the longitudinal direction.

The latch section 44B can be advanced and retracted in the lateral direction. When advanced, the latch section 44B locks from above the bottom portion of the locked tab 45 that has passed downwardly through the slit 30A. When retracted, the latch section 44B leaves the bottom portion of the locked tab 45.

The bottom portion (locking part) of the locked tab 45 is formed into a forwardly ascending step. A high level locking part 45A locked by the latch section 44B when the rider's seat 26 is on a high level is set at a part of the bottom portion of the step-shaped locked tab 45 positioned on a low level (see FIG. 4). A low level locking part 45B locked by the latch section 44B when the rider's seat 26 is on a low level is set at a part of the bottom portion of the locked tab 45 positioned on a high level (see FIG. 6).

As shown in FIGS. 4 and 6, a moving restricting section 46 that restricts movement of the front portion side of the rider's seat 26 is formed at a front portion of the bottom plate 26A that forms the covering portion 26C in the rider's seat 26.

The moving restricting section 46 includes a high level locked part 48 and a low level locked part 49. The high level locked part 48 is locked by a locking part 47 disposed to protrude rearwardly from the upper surface 25S of the fuel tank 25 when the rider's seat 26 is on the high level (see FIG. 4). The low level locked part 49 is locked by the locking part 47 when the rider's seat 26 is on the low level (see FIG. 6). The high level locked part 48 and the low level locked part 49 are arranged in tandem upwardly toward the front, the high level locked part 48 being formed at a level lower than the low level locked part 49. The high level locked part 48 and the low level locked part 49 each have an inverted-U-shaped opening that opens downwardly in a front view, in which the locking part 47 is received.

The height adjustment process for the rider's seat 26 will be described briefly below. The operator first cancels a locked state of the seat lock mechanism 44 relative to the locked tab 45 and removes the rider's seat 26. The seat lock mechanism 44 allows the latch section 44B to be brought into the retracted state through, for example, a key operation.

Next, the operator inserts to position the insert 43 at the rear end portion of the rider's seat 26 into either one of the high-level receiving holder 42A and the low-level receiving holder 42B in the insert holder 42.

Thereafter, the front seat-side protrusions 34L and 34R and the rear seat-side protrusions 35L and 35R are abutted on the abutment surfaces of the front vehicle body-side steps 32L and 32R and the rear vehicle body-side steps 33L and 33R associated with either one of the high-level receiving holder 42A and the low-level receiving holder 42B.

The latch section 44B is urged so as to be maintained in the advanced state. When the locked tab 45 is moved past the slit 30A, the latch section 44B is retracted. When the bottom portion of the locked tab 45 reaches a point below the latch section 44B, the latch section 44B is brought back into the advanced state, so that the locked tab 45 and the latch section 44B are in the locked state. This completes the height adjustment process for the rider's seat 26.

In FIGS. 4 and 6, reference symbol θ1 denotes an angle formed between a direction in which the front low-level abutment surfaces 37 and the front high-level abutment surfaces 36 of the front vehicle body-side steps 32L and 32R are arranged and a horizontal direction. Reference symbol θ2 denotes an angle formed between a direction in which the rear low-level abutment surfaces 39 and the rear high-level abutment surfaces 38 of the rear vehicle body-side steps 33L and 33R are arranged and the horizontal direction.

In this example, the angle θ1 and the angle θ2 are substantially identical to each other. As a result, when the height of the rider's seat 26 is adjusted, posture of the rider's seat 26 does not basically change before and after the adjustment and the rider's seat 26 moves in parallel along the direction of the angle θ1 or the angle θ2.

In addition, an angle θ3 formed between an inclination direction of the covering portion 26C of the rider's seat 26 and the upper surface 25S of the fuel tank 25 extending substantially in parallel with the covering portion 26C and the horizontal direction is substantially identical to the angle θ1 and the angle θ2.

In the motorcycle 1 according to certain embodiments, as is evident from comparing FIG. 4 with FIG. 6, when abutment positions of the front seat-side protrusions 34L and 34R and the rear seat-side protrusions 35L and 35R are changed from either first ones of the front vehicle body-side steps 32L and 32R and the rear vehicle body-side steps 33L and 33R to second ones, the covering portion 26C can change its position so as to slide substantially in parallel with the inclined upper surface 25S of the fuel tank 25 as indicated by an arrow α in FIG. 6.

The angles described above are substantially identical to each other when the angles are completely identical to each other, and also when they contain a slight deviation from each other.

In the motorcycle 1 according to certain embodiments of the present invention, when the abutment positions of the front seat-side protrusions 34L and 34R and the rear seat-side protrusions 35L and 35R are changed from either first ones of the front vehicle body-side steps 32L and 32R and the rear vehicle body-side steps 33L and 33R to second ones, the covering portion 26C can change its position so as to slide in parallel with the inclined upper surface 25S of the fuel tank 25.

Thus, in the motorcycle 1, a condition is maintained in which the covering portion 26C formed at the front portion of the rider's seat 26 extends substantially in parallel with the upper surface 25S of the fuel tank 25 before and after the height adjustment of the rider's seat 26. This can minimize a change in vehicle appearance before and after the adjustment, thereby allowing an impression a spectator has of the vehicle appearance to be prevented from being changed.

Additionally, in examples of the motorcycle 1, the front seat-side protrusions 34L and 34R and the rear seat-side protrusions 35L and 35R are separately mounted to the bottom plate 26A and the front seat-side recesses 40L and 40R and the rear seat-side recesses 41L and 41R are formed immediately before the front seat-side protrusions 34L and 34R and the rear seat-side protrusions 35L and 35R, the front seat-side recesses 40L and 40R and the rear seat-side recesses 41L and 41R being formed by indenting the bottom plate 26A upwardly. This results in the front seat-side protrusions 34L and 34R and the front seat-side recesses 40L and 40R being joined to each other in a step fashion and the rear seat-side protrusions 35L and 35R and the rear seat-side recesses 41L and 41R being joined to each other in a step fashion.

When the abutment positions of the front seat-side protrusions 34L and 34R and the rear seat-side protrusions 35L and 35R are changed from the high-level abutment surfaces (36, 38) to the low-level abutment surfaces (37, 39), so that the height of the rider's seat 26 is adjusted to be lowered, the second steps (32L2, 32R2, 33L2, 33R2) on which the high-level abutment surfaces (36, 38) are set are housed in the front seat-side recesses 40L and 40R and the rear seat-side recesses 41L and 41R.

The foregoing arrangement enables height adjustments to be made with the protrusions and the recesses on the seat side and the vehicle body side and load of the rider's seat 26 can be reliably supported by the front vehicle body-side steps 32L and 32R and the rear vehicle body-side steps 33L and 33R. Additionally, the structure involved is simple, so that a manufacturing cost can be reduced for configuring the seat height adjustment structure.

In examples of the motorcycle 1, the front vehicle body-side steps 32L and 32R and the rear vehicle body-side steps 33L and 33R are each formed into a step-like shape having a plurality of abutment surfaces set therein. Thus, the structure is simple and permits one-piece forming, so that the manufacturing cost can be reduced for configuring the seat height adjustment structure.

Additionally, in the motorcycle 1, the front seat-side protrusions 34L and 34R and the rear seat-side protrusions 35L and 35R, and the front vehicle body-side steps 32L and 32R and the rear vehicle body-side steps 33L and 33R are each disposed in pairs at the middle portion and the rear portion of the rider's seat 26. Furthermore, the front seat-side protrusions 34L and 34R and the rear seat-side protrusions 35L and 35R, and the front vehicle body-side steps 32L and 32R and the rear vehicle body-side steps 33L and 33R are disposed above or on the inside in the vehicle width direction of the seat rails 14L and 14R that form part of the vehicle body frame 10.

The foregoing arrangement enables the rider's seat 26 to be supported on the vehicle body frame 10 at four points at front and rear and at left and right, so that the seat load can be steadily supported.

Additionally, in certain examples, the rider's seat 26 includes the insert 43 at the rear end portion thereof, the insert 43 being inserted into the insert holder 42 formed on the vehicle body side. The rider's seat 26 further has the locked tab 45 to be locked by the seat lock mechanism 44 disposed on the vehicle body side. The insert holder 42 includes the high-level receiving holder 42A and the low-level receiving holder 42B formed in a multiple-tier stack so as to allow the insert 43 to be inserted into a proper tier associated with each adjustment position when the height position of the rider's seat 26 is adjusted. The locked tab 45 has the step-shaped locking parts to be locked by the latch section 44B of the seat lock mechanism 44 according to the adjustment position when the height position of the rider's seat 26 is adjusted.

The foregoing arrangement enables the rear end portion of the rider's seat 26 to be positioned and the rider's seat 26 to be locked in place suitably without any impediments before and after the adjustment.

Additionally, in example of motorcycle 1, the locked tab 45 is disposed between the left and right front seat-side protrusions 34L and 34R disposed at the middle portion of the rider's seat 26. The seat lock mechanism 44 is mounted on the first cross frame 30 that connects the left and right seat rails 14L and 14R forming part of the vehicle body frame 10.

The foregoing arrangement results in the seat lock mechanism 44 and the locked tab 45 being sandwiched laterally between the front seat-side protrusions 34L and 34R and the rear seat-side protrusions 35L and 35R, and between the front vehicle body-side steps 32L and 32R and the rear vehicle body-side steps 33L and 33R, so that the seat lock mechanism 44 and the locked tab 45 can be prevented from being tampered with. In addition, the arrangement allows the first cross frame 30 to rigidly support the seat lock mechanism 44.

While the present invention has been particularly described with reference to specific embodiments, it will be understood that the embodiments are not intended to limit the present invention and various changes in form and detail may be made therein without departing from the spirit and scope of the invention.

For example, embodiments have been described for the configuration that allows the rider's seat 26 to be adjusted in height in two steps. The present invention may nonetheless be applied to embodiments that allows the height to be adjusted in three or more steps and the front vehicle body-side steps 32L and 32R and the rear vehicle body-side steps 33L and 33R may be each formed into, for example, a three-or-more-step stair.

In addition, in the above-described embodiments, the front seat-side recesses 40L and 40R and the rear seat-side recesses 41L and 41R are each formed by indenting the bottom plate 26A upwardly; however, the front seat-side recesses 40L and 40R and the rear seat-side recesses 41L and 41R may instead be each formed by penetrating the bottom plate 26A.

In the above-described embodiments, the present invention is applied to a motorcycle as an example of a saddle-riding type vehicle. The saddle-riding type vehicle, as used herein, is a concept that encompasses types of vehicles in general in which a rider straddles the vehicle body to ride thereon, including three-wheeled and four-wheeled vehicles as well as the motorcycle. Thus, the present invention is applicable also to a three-wheeled or a four-wheeled vehicle, in addition to the motorcycle.

DESCRIPTION OF REFERENCE SYMBOLS

1: Motorcycle (Saddle-riding type vehicle)
10: Vehicle body frame
25: Fuel tank
25S: Upper surface
26: Rider's seat (Seat)
26A: Bottom plate
26C: Covering portion
30: First cross frame (Cross frame)
32L, 32R: Front vehicle body-side step
32L1, 32R1, 33L1, 33R1: First step
32L2, 32R2, 33L2, 33R2: Second step
33L, 33R: Rear vehicle body-side step
34L, 34R: Front seat-side protrusion (Seat-side protrusion)
35L, 35R: Rear seat-side protrusion (Seat-side protrusion)
36, 38: High-level abutment surface (Abutment surface)
37, 39: Low-level abutment surface (Abutment surface)
40L, 40R: Front seat-side recess
41L, 41R: Rear seat-side recess
42: Insert holder
43: Insert
44: Seat lock mechanism
45: Locked tab

The invention claimed is:

1. A saddle-riding type vehicle, comprising:
a vehicle body frame;
a fuel tank supported on the vehicle body frame;
a seat supported on the vehicle body frame;
downwardly protruding seat-side protrusions disposed on a bottom plate of the seat; and
vehicle body-side steps disposed below the seat-side protrusions, the vehicle body-side steps having a plurality of abutment surfaces on which the seat-side protrusions abut from above, each abutment surface having a height different from each other, the seat being adjustable in height by selectively abutting the seat-side protrusions on the abutment surfaces, wherein
the fuel tank has an upper surface formed into an incline that extends downwardly toward a rear of the fuel tank,
the seat has a covering portion, the covering portion extending substantially in parallel with the inclined upper surface of the fuel tank, the covering portion covering the upper surface from above,
when abutment positions of the seat-side protrusions are changed from either first ones of the abutment surfaces to second ones, the covering portion changes a position thereof so as to slide substantially in parallel with the inclined upper surface of the fuel tank, and
wherein the seat-side protrusions and the vehicle body-side steps are each disposed in pairs at a middle portion and a rear portion of the seat, and wherein the seat-side protrusions and the vehicle body-side steps are disposed above or on an inside in a vehicle width direction of the vehicle body frame.

2. The saddle-riding type vehicle according to claim 1, wherein
the seat-side protrusions are mounted separately on the bottom plate,
the bottom plate has seat-side recesses disposed immediately before the seat-side protrusions, the seat-side recesses being formed by indenting upwardly or penetrating the bottom plate, and wherein when the abutment positions of the seat-side protrusions are changed from either first ones of the abutment surfaces to second ones among the abutment surfaces, so that the first ones of the abutment surfaces are adjusted to be higher than the second ones and a height of the seat is adjusted to be lowered, the first ones of the abutment surfaces are housed in the seat-side recesses.

3. The saddle-riding type vehicle according to claim 1, wherein the vehicle body-side steps are formed into a stair having integrally a plurality of steps on which the abutment surfaces are set, and wherein the vehicle body-side steps are supported on the vehicle body frame.

4. The saddle-riding type vehicle according to claim 1, wherein, of the vehicle body-side steps disposed in pairs at the middle portion and the rear portion of the seat, first ones disposed at either one of the middle portion and the rear portion of the seat are disposed on a cross frame that connects portions provided in pairs of the vehicle body frame and second ones disposed at another of the middle portion and the rear portion of the seat are directly disposed on the vehicle body frame.

5. The saddle-riding type vehicle according to claim 1, wherein
the seat includes an insert disposed at a rear end portion thereof, the insert configured to be inserted into an insert holder formed on a vehicle body side,
the seat further includes a locked tab configured to be locked by a seat lock mechanism disposed on the vehicle body side,
the insert holder is formed in a multiple-tier stack so as to allow the insert to be inserted into a tier associated with each adjustment position when the seat is adjusted in height, and wherein
the locked tab has step-shaped locking parts configured to be locked by the seat lock mechanism, the step-shaped locking parts being associated with respective adjustment positions when the seat is adjusted in height.

6. The saddle-riding type vehicle according to claim 5, wherein
the locked tab is disposed between the pair of left and right seat-side protrusions disposed at the middle portion of the seat, and
the seat lock mechanism is mounted on the cross frame that connects portions provided in pairs of the vehicle body frame.

7. A saddle-riding type vehicle, comprising:
holding means for holding vehicle components thereupon;
storing means for storing fuel therein, the storing means being supported on the holding means;
supporting means for supporting a rider thereupon, said supporting means supported on the holding means;
protruding means for protruding from a seat-side, said protruding means disposed on a bottom of the supporting means; and
engaging means for engaging the protruding means, said engaging means including a plurality of abutment surfaces,
wherein the protruding means abut the abutment surfaces from above, each abutment surface having a different height from other abutment surfaces,
wherein the supporting means is adjustable in height by selectively abutting the protruding means on the abutment surfaces, wherein the storing means includes an upper surface disposed at an incline extending downwardly toward a rear of the storing means,
wherein the supporting means includes covering means for covering the supporting means, said covering means extending substantially in parallel with the upper surface of the storing means, the covering means covering the upper surface from above,
wherein, when abutment positions of the protruding means are changed from either first ones of the abutment surfaces to second ones of the abutment surfaces, the covering means changes a position thereof so as to slide substantially in parallel with the upper surface of the storing means,
wherein the protruding means and the engaging means are each disposed in pairs at a middle portion and a rear portion of the supporting means,
and wherein the protruding means and the engaging means are disposed above or on an inside in a vehicle width direction of the holding means.

8. The saddle-riding type vehicle according to claim 7,
wherein the protruding means is mounted separately on the bottom of the supporting means,
wherein the bottom of the supporting means includes plate means having seat-side recesses disposed immediately before the seat-side protruding means, the seat-side recesses being formed by indenting upwardly or penetrating the plate means, and
wherein when the abutment positions of the protruding means are changed from either first ones of the abutment surfaces to second ones among the abutment surfaces, so that the first ones of the abutment surfaces are adjusted to be higher than the second ones, and a height of the supporting means is adjusted to be lowered, the first ones of the abutment surfaces are housed in the seat-side recesses.

9. The saddle-riding type vehicle according to claim 7,
wherein the engaging means are formed into a stair having a plurality of steps integrally formed therein on which the abutment surfaces are set, and
wherein the engaging means are supported on the holding means.

10. The saddle-riding type vehicle according to claim 7, wherein, of the engaging means disposed in pairs at the middle portion and the rear portion of the supporting means, first ones disposed at either one of the middle portion and the rear portion of the supporting means are disposed on a cross frame means for connecting portions provided in pairs of the holding means and second ones disposed at another of the middle portion and the rear portion of the supporting means are directly disposed on the holding means.

11. The saddle-riding type vehicle according to claim 7,
wherein the supporting means includes an insert means disposed at a rear end portion thereof, the insert means for being inserted into an insert holder formed on a vehicle body side,
wherein the supporting means includes a locked tab for being locked by a seat lock mechanism disposed on the vehicle body side,
wherein the insert holder is formed in a multiple-tier stack, enabling the insert means to be inserted into a tier associated with each adjustment position when the supporting means is adjusted in height, and
wherein the locked tab has step-shaped locking means for being locked by the seat lock mechanism, the step-shaped locking means being associated with respective adjustment positions when the supporting means is adjusted in height.

12. The saddle-riding type vehicle according to claim 11, wherein the locked tab is disposed between the pair of protruding means disposed at the middle portion of the supporting means, and wherein the seat lock mechanism is mounted on the cross frame that connects portions provided in pairs of the holding means.

* * * * *